United States Patent Office 3,158,485
Patented Nov. 24, 1964

3,158,485
COFFEE SUBSTITUTE AND THE METHOD OF MAKING IT AND OTHER FOOD PRODUCTS
Vincent De Santa Luce, 12424 S. Atlantic Ave., Compton, Calif., assignor of twenty-one and seventy-five hundredths percent to Carl C. Anderson, Sr., Albuquerque, N. Mex., nine and three-hundred and seventy-five thousandths percent to George Jonovich, nine and three-hundred and seventy-five thousandths percent to John Wilnau, seven and five-tenths percent to Allen Belluzzi, and ten percent to Donald J. Baumann, all of Scottsdale, Ariz., and eleven percent to Maxie L. Anderson and eleven percent to Carl C. Anderson, Jr., both of Albuquerque, N. Mex.
No Drawing. Filed Apr. 25, 1961, Ser. No. 105,287
25 Claims. (Cl. 99—75)

The present invention relates generally to food products and methods of making them, and more particularly to an improved food product which may be used for making coffee-like beverages free of caffeine and which may be used to give a coffee-like flavor to candy, ice cream, soft drinks, such as carbonated beverages, and similar uses, and to a method of making said food product and other food products.

Coffee is used extensively as a beverage and as a flavoring for various food products. Caffeine in coffee is a stimulant and objectionable if consumed in excessive quantities and frequently objectionable if consumed in normal quantities by persons afflicted with heart disease. Doctors frequently request patients not to use coffee or to use it in small quantities. Since coffee is habit-forming, it is difficult for the patients to comply. Many Mormons refuse, on religious grounds, to drink coffee, because it contains caffeine. Coffee, by reason of its stimulating nature, frequently causes insomnia when consumed at night.

Numerous attempts have been made to find a substitute for coffee which does not contain caffeine. One such product, "Postum," is made from wheat, bran and molasses, and has been sold in large quantities for many years. Other products such as "Sanka" utilize coffee but remove substantially all of the caffeine from it. Such products simulate coffee but there is a substantial difference in their taste and aroma and in the taste and aroma of real coffee.

The present invention provides an inexpensive, improved coffee substitute having a true coffee aroma and flavor and being more satisfying than previous coffee substitutes. The invention attains this result from ingredients readily available in most countries and in most climates without requiring the importation of coffee or similar products from countries having tropical climates.

An object of the present invention is to provide an improved coffee substitute made from vegetable materials and having an aroma and taste approximating that of real coffee.

Another object of the invention is to provide an improved method of making coffee substtiutes and other food products.

Another object of the invention is to provide an improved method of making extracts or concentrates of fruit and vegetable juices.

Another object of the present invention is to provide a coffee substitute having an aroma and taste approximating that of real coffee which is less expensive than real coffee and made from vegetables easily grown in most of the countries of the world.

Another object of the invention is to provide a coffee substitute which may be combined with powdered milk or combined in powdered form to simulate coffee and milk when mixed with water.

Another object of the invention is to provide coffee-flavored soft drinks by combining the coffee substitute with carbonated water.

A further object of the invention is to provide a coffee substitute, syrup or powder, for use in candies, ice cream and other food products.

A further object of the invention is to provide a food product which will serve as a booster or additive for real coffee to improve its aroma and flavor.

A further object of the invention is to avoid the use of caffeine in the above coffee substitutes.

Other and further objects of the invention will occur to one skilled in the art upon employment of the invention in practice or from reading the following description.

A preferred embodiment of the invention will now be described together with one way of making the products.

In the preferred method of making a coffee substitute, tomato vines, without tomatoes but preferably with the vines and the roots, are cleaned and then ground or otherwise reduced to relatively small particles for best results.

Dandelions, preferably the entire plant with roots attached, are cleaned and then ground or otherwise reduced to small particles for best results.

Excellent results are obtained with tomato vines grown until they are from 12 to 14 inches above the ground and before tomatoes have grown on the vines, as the tomatoes tend to draw desirable substances from the vines. Excellent results are obtained with dandelions grown until they are 6 to 8 inches high when both the plant and roots are measured. These sizes are not critical and may vary with different soils, weather, or climate. Preferably, the vines are reasonably tender and not too tough and should be used while fresh.

The ground tomato vines may be put in bags or containers for convenience which are then placed in a freezer and kept at a temperature of 15 to 20° below zero Fahrenheit for a substantial period of time. Best results have been obtained with a 30-day period of refrigeration but a shorter or longer period may be utilized. The longer the freezing period up to about 30 days, the more nutritional elements are removed from the vines and less nutritional values are lost when the vines are cooked. Also, with the longer freezing period the pores remain open better so that more liquid gets out. Storage for convenience beyond the 30-day period will not impair the product, the vines, or the plants; hence, refrigeration may be continued in the deep freezer until the product is needed in production.

After the refrigeration the ground vines are then permitted to remain at a defrosting temperature, preferably room temperature. The liquid which drips or sweats from the ground vines is collected and saved for later use. This liquid contains rich nutritional elements which would be partially lost in the cooking of the vines if not removed from them before cooking. This nutritional loss may be as much as 40 percent.

The method described above is also followed in preparing the dandelions and the same general results are obtained. The liquid which drips or sweats out is also collected and saved for later use.

The liquids resulting from the dripping or sweating during defrosting in both cases are added to the mixture of liquids or brews resulting after cooking the tomato vines and the dandelions to give a rich aroma and to add nutritional values.

The ground tomato vines are then cooked or otherwise treated to remove the remaining liquid naturally contained in them. The ground defrosted vines may be cooked in water preferably for a period of 2 to 3 hours at a temperature of about 400° F. in a pressure cooker or retort. Longer periods of cooking are required at lower temperatures and shorter periods at higher temperatures up to a point where the heat may damage the product. At the end of the cooking period a foam will appear on the surface of the mixture of vines and water. The appearance of the foam is a good indication of the end of the cooking period.

The defrosted dandelions are separately and similarly cooked at a similar temperature and for a similar period to remove the liquid naturally present in the defrosted vines.

Preferably, nine gallons of water, about 75 pounds, are added for each three pounds of defrosted vines. As indicated, the tomato vines and dandelions are separately cooked and combined after cooking.

At the end of the cooking, the liquid mass in the cooker, either before or after it is mixed with the cooked residue of the other product, is strained by passing it through a suitable screen to remove discernable solids from the liquid. Preferably, the strained liquid is then passed once through a charcoal filter containing activated charcoal. The liquid leaving the charcoal filter is noticeably lighter than the original greenish-tan color, thus giving a better appearance to the product and improving its quality.

After both the tomato vines and the dandelions have been cooked, strained and filtered as described above, they are mixed together. As indicated above, they may be mixed, if desired, before or after straining and filtering but best results have been obtained when they are cooked separately. The drippings saved from both products at the time of defrosting are then added.

Preferably, the mixture is in the ratio of 60, 30 and 10 percent, that is, 60 percent of dandelion liquid, 30 percent of the tomato vine liquid and 10 percent of the drippings collected during the defrosting of both the dandelions and the tomato vines. The drippings from the dandelions are usually more than the drippings from the tomato vines. The complete drippings from both products are preferably used.

The above proportions give good results but they are not critical and can be varied within reasonably wide ranges to obtain the desired aroma and flavor in the finished product. An increase or decrease of as much as 10 or 15 percent in the proportion of the dandelion liquid may be made with variations in the aroma and taste. Likewise, an increase or decrease of 10 or 15 percent in the liquid residue from the tomato vines can be made with variations in taste and aroma. Also, the amount added of the liquid obtained from the defrosting can be varied substantially with variations in taste and aroma. The above percentages are by volume as the measurements were made in gallons.

The resulting heated mixture is concentrated by being forced through a spray dryer into a heated enclosure to form a crystalline substance, preferably having a uniform granular character of a powdery nature, much like the present instant coffee widely sold in jars in super markets.

Spray dryers of the type used for spray drying liquid coffee to obtain powdered coffee may be used in spray drying the present liquid. Described generally, the liquid passes through a series of heated tubes or coils and then is sprayed into a heated enclosure to obtain a powdered product. The powder resulting from the spray drying is an excellent coffee substitute when mixed with hot or cold water. The color, aroma and taste closely approximate that of real coffee. However, the product and the beverage made from it do not contain caffeine. Any other suitable spray dryers may be used to obtain either a powder or liquid extract. Such dryers are well-known and do not require a detailed description.

The powdered or liquid extract or the liquid mix from which it is made may be used as a flavoring for other foods and beverages, for example, candy, ice cream and carbonated drinks.

While the powdered product is particularly useful for making "instant coffee" substitute, it can be used for preparing substitute coffee in the usual coffee maker. If desired, this product may be made in concentrated form with larger grains to simulate regular ground coffee for use in coffee makers.

Likewise, the product resulting from the cooking, straining and filtering of the defrosted tomato vines can be added to the residue or liquid obtained from the defrosting and sweating of the tomato vines to form a "booster" or additive for coffee products. By adding a portion of the additive or booster to coffee, an improved aroma and flavor are obtained.

While spray drying is preferred for concentrating the liquid mix into a granular product, vacuum pans or cookers may be utilized for the same purpose. Preferably, temperatures on the order of 155° to 175° F. are used for this purpose. The cooking continues until the crystalline substance is obtained. The crystals or powder is hydroscopic in nature and brown in color.

Where it is desired to form a substitute coffee product which is similar to regular coffee (as distinguished from instant coffee) for use in percolators, etc., less concentration is required. In such cases, the entire mixture, without screening off the liquid from the cooked products, preferably after suitable concentration by vacuum pans or otherwise, may be mixed with the drippings and the entire mix will form particles the proper size to simulate ground or pulverized coffee. If greater uniformity is desired, a grinder may be used.

I have discovered that the process described above with reference to making substitute coffee may be used for making fruit and vegetable juices or fruit and vegetable juice concentrates. For example, oranges may be peeled and cut into several sections, for example, six, placed for convenience in liquid-retaining bags or trays, which retain the juice or drippings from the fresh cut oranges and then placed in a deep freeze at a temperature of 15 or 20° below zero (Fahrenheit) for 30 days. Thereafter, the frozen orange sections are removed and defrosted, preferably at room temperature, and the drippings in the bags or other containers are saved for later mixing. However, with oranges and grapefruit, only a small amount of drippings is later mixed with the residue of the cooked mass. I have found that about one quart of the drippings is sufficient for fifty gallons of the cooked residue. The remainder of the drippings may be kept as a reserve for future batches which may have insufficient drippings.

The orange sections are then cooked as described above with respect to the cooking of tomato vines for a similar period and at similar temperatures until a foam forms on the top indicating completion of the cooking. The cooked product is then screened, passed once through a charcoal filter having activated charcoal in it, which improves the color and taste. The residue is then mixed with the proper amount of uncooked drippings from the fruit juice caught in the bags or other containers, about one quart for fifty gallons. The combined mixture is then spray dried in the usual type of spray dryer for making orange juice concentrates or coffee concentrates.

The resulting product, if completely spray dried, is a powder, which when mixed with water provides orange juice, having a taste and appearance closely approximating that of fresh orange juice. The fresh orange juice from the drippings adds to the flavor and the prolonged refrigeration also improves the flavor and taste. Concentrated or powdered tomato juice, grapefruit juice, apple juice and other fruit and vegetable juices for example, celery, carrots, beets, rhubarb or mixtures thereof may be made by the same process described above with respect to oranges. The refrigeration in a deep freezer for a long period, the separation of the drippings during the defrosting and their later addition, without cooking, to the cooked residue give an improved product having a taste and appearance approximating the taste and appearance of the real product when water is added.

It will be seen that an improved coffee substitute and a method of making it and other food products, have been provided including an improved method of making extracts of fruit and vegetable juices. The plants or vegetables forming the components of the coffee substitute may be grown in most countries and in most climates. The extract and beverage has a color, aroma and taste approximating that of real coffee. The product is inexpensive and may be made with equipment now available.

While the product and method are primarily for an instant coffee substitute, this product may be used in conventional coffee makers. The product may also be used for flavoring candy, ice cream and carbonated beverages. The process may also be utilized for making juice concentrates from oranges, grapefruit, apples, tomatoes and other fruits and vegetables.

As various changes may be made in the periods and temperatures of cooking, periods and temperatures of refrigeration, proportions and ingredients, the form and types of apparatus used and other detailed procedures, including time and temperatures and quantities, without departing from the spirit and scope of the invention and without sacrificing any of its advantages, it is to be understood that all matter herein is to be interpreted as illustrative and not in a limiting sense.

Having thus described my invention, I claim:

1. A food product containing a coffee substitute which comprises essentially the combination of a liquid mix derived from the vines of tomatoes and a liquid mix derived from dandelions.

2. A coffee substitute comprising as its major ingredients a concentrate of a liquid mix derived from the vines of tomatoes and a concentrate of a liquid mix derived from dandelions.

3. A coffee substitute as defined in claim 2 in which the resulting mix is a powdered concentrate.

4. A food product containing a coffee substitute which comprises a concentrate of a liquid mix derived from tomato vines in the proportion of about 30%.

5. A food product as defined in claim 4 in which the concentrate is in powdered form.

6. A food product containing a coffee substitute which comprises as its major ingredient the combination of a liquid mix derived from the vines and roots of tomatoes and a liquid mix derived from dandelions.

7. A food product having a coffee-like flavor comprising essentially a concentrate derived from tomato vines combined with a concentrate derived from dandelions.

8. A food product as claimed in claim 7, in which the concentrate is in powdered form.

9. A method of making a food product which comprises freezing and thereafter cooking the vines of tomatoes, freezing and thereafter cooking dandelions and combining portions of each of said cooked products.

10. A method as claimed in claim 9 in which the proportions are on the order of 60 to 70 percent from the dandelions and 40 to 30 from the tomato vines.

11. A method as claimed in claim 9 in which substantial portions of the cooked products are removed therefrom in order to form an extract.

12. A method as claimed in claim 9 in which the roots are included with the vines.

13. The method of making a food product which comprises freezing the vines of tomatoes at temperatures below zero Fahrenheit, cooking the vines, freezing dandelions at temperatures below zero Fahrenheit, cooking the dandelions after freezing and mixing the residue from the cooking of the dandelions and the tomato vines.

14. The method as claimed in claim 13 in which drippings from the defrosting of the dandelions and tomato vines are collected and mixed with the combined residue obtained from the cooking of the dandelions and the tomato vines.

15. The method of making a food product which comprises freezing the vines of tomatoes at temperatures on the order of 15° below zero Fahrenheit for a period on the order of 30 days, defrosting the vines, collecting the drippings from the defrosted vines, cooking the defrosted vines, freezing dandelions at temperatures on the order of 15° below zero Fahrenheit for a period on the order of 30 days, defrosting the dandelions, retaining the drippings from the defrosting, cooking the defrosted dandelions, passing the residue from the cooking of each of said products through a screen and thereafter through a charcoal filter having activated charcoal therein, mixing the residue of each of the cooks with at least a substantial portion of the drippings from each of the products.

16. The method as claimed in claim 15 in which the liquid is spray dried to form a powder useful as a coffee substitute for making instant coffee.

17. The method of making a food product which comprises freezing peeled fruit, selected from the group consisting of oranges and grapefruit, at temperatures below zero Fahrenheit for a substantial period of time, defrosting the fruit and collecting the drippings during the defrosting, cooking the defrosted fruit and mixing a small part of the uncooked drippings with the cooked fruit, screening the cooked fruit.

18. The method as claimed in claim 17 in which the resulting mix is spray dried to form a powder useful as a concentrate to make a fruit juice by the addition of water.

19. The method of making a food product which comprises freezing tomatoes at temperatures below zero, Fahrenheit, defrosting the tomatoes and collecting the drippings from the defrosting, cooking the tomatoes, screening the liquid from the cook and passing it through a charcoal filter and thereafter mixing the liquid with the uncooked drippings collected at the time of defrosting.

20. The method as claimed in claim 19 in which the resulting liquid mix is spray dried to obtain a powdered concentrate useful in the making of fruit juices by the addition of water.

21. A method of making a food product which comprises freezing a vegetable selected from the group consisting of celery, carrots, beets, rhubarb, at a temperature below zero Fahrenheit, defrosting the vegetable and saving the drippings from the defrosting, cooking the vegetable, passing the residue of the cook through a screen for removing solid particles and through a charcoal filter, thereafter mixing the filtered residue with the uncooked drippings collected during the defrosting.

22. A method as claimed in claim 21 in which a plurality of the vegetables of said group are mixed and utilized.

23. A method as claimed in claim 21 in which the resulting mix is spray dried to form a powder useful in making vegetable juices by the addition of water.

24. A coffee substitute as defined in claim 2 in which the liquid mix is derived in part at least by cooking.

25. A coffee substitute as defined in claim 2 in which at least one of the liquid mixes comprises a cooked component and an uncooked component.

References Cited in the file of this patent

UNITED STATES PATENTS

| | | |
|---|---|---|
| 2,369,042 | Graham et al. | Feb. 6, 1945 |
| 2,483,634 | Graham et al. | Oct. 4, 1949 |
| 2,602,750 | Cunningham | July 8, 1952 |
| 2,639,236 | Zachary | May 19, 1953 |
| 2,937,948 | Luce | May 24, 1960 |

OTHER REFERENCES

"The Chemistry and Technology of Fruit and Vegetable Juice Production," 1954, by Tressler et al. The Avi Publishing Co., Inc. (New York), p. 434.

"Principles of Sugar Technology," 1953, by Honig Elsevier Publishing Co. (New York), p. 416.